United States Patent
Ballet et al.

(10) Patent No.: US 7,828,430 B2
(45) Date of Patent: Nov. 9, 2010

(54) TRANSPARENT OPTICAL COMPONENT WITH CELLS SEPARATED BY WALLS

(75) Inventors: Jérôme Ballet, Charenton-le-Pont (FR); Christian Bovet, Charenton-le-Pont (FR); Jean-Paul Cano, Charenton-le-Pont (FR); Gilles Mathieu, Montpellier (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 205 days.

(21) Appl. No.: 11/996,098

(22) PCT Filed: Jul. 13, 2006

(86) PCT No.: PCT/IB2006/003267

§ 371 (c)(1),
(2), (4) Date: Jul. 11, 2008

(87) PCT Pub. No.: WO2007/029117

PCT Pub. Date: Mar. 15, 2007

(65) Prior Publication Data

US 2008/0297720 A1    Dec. 4, 2008

(30) Foreign Application Priority Data

Jul. 20, 2005    (FR) .................... 05 07719

(51) Int. Cl.
*G02C 7/02*    (2006.01)
(52) U.S. Cl. ..................................... 351/159

(58) Field of Classification Search .............. 351/44, 351/159, 160 R
See application file for complete search history.

(56) References Cited

U.S. PATENT DOCUMENTS

| | | | | |
|---|---|---|---|---|
| 2,196,066 A | * | 4/1940 | Feinbloom | 351/219 |
| 3,978,580 A | | 9/1976 | Leupp et al. | |
| 4,268,132 A | * | 5/1981 | Neefe | 351/160 H |
| 4,621,912 A | * | 11/1986 | Meyer | 351/160 R |
| 5,044,742 A | * | 9/1991 | Cohen | 351/161 |
| 5,067,795 A | | 11/1991 | Senatore et al. | |
| 5,763,054 A | * | 6/1998 | Samec et al. | 428/195.1 |
| 6,118,510 A | | 9/2000 | Bradshaw et al. | |
| 2002/0140899 A1 | | 10/2002 | Blum et al. | |
| 2003/0147046 A1 | * | 8/2003 | Shadduck | 351/159 |
| 2003/0152849 A1 | | 8/2003 | Chan-Park et al. | |

FOREIGN PATENT DOCUMENTS

DE    19714434    10/1998
WO    WO03/012542    2/2003

* cited by examiner

*Primary Examiner*—Joseph Martinez
*Assistant Examiner*—James R Greece
(74) *Attorney, Agent, or Firm*—Occhiuti Rohlicek & Tsao LLP

(57) ABSTRACT

A transparent optical component comprises a set of cells (15) juxtaposed on a surface of the component. Each cell encloses a determined substance so as to endow the component with particular optical characteristics, and two neighbouring cells are separated by a wall (18). Some walls are not straight at the surface of the component, so that the light diffracted by the walls does not form any luminous glint or any flashing. In particular, the walls can be curved or made up of straight segments disposed end-to-end.

16 Claims, 2 Drawing Sheets

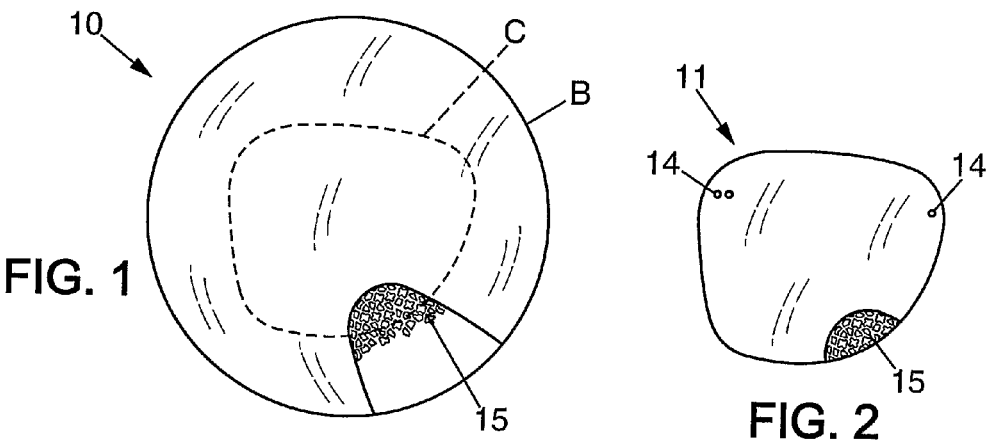
FIG. 1
FIG. 2
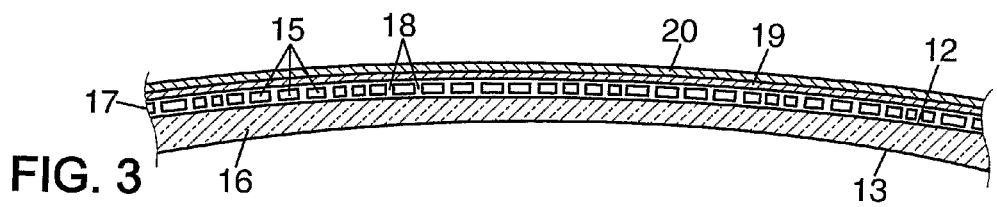
FIG. 3
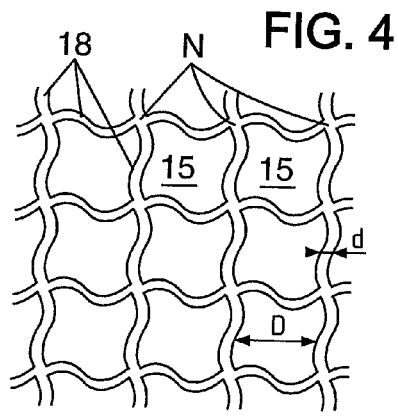
FIG. 4
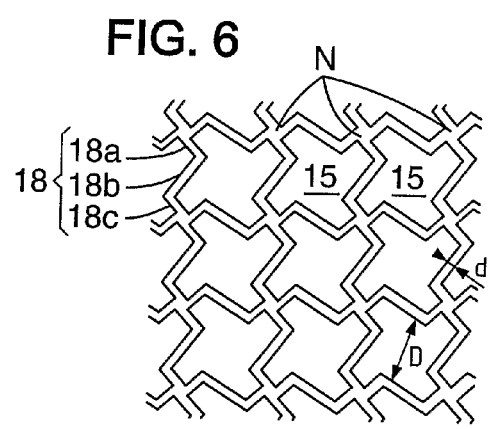
FIG. 6
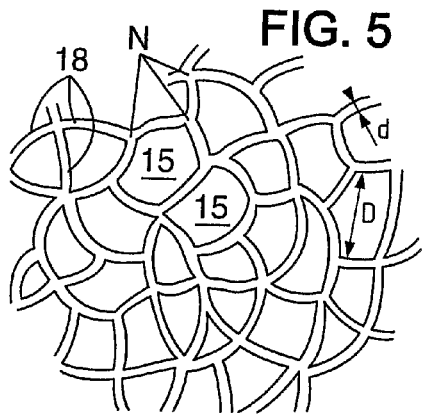
FIG. 5
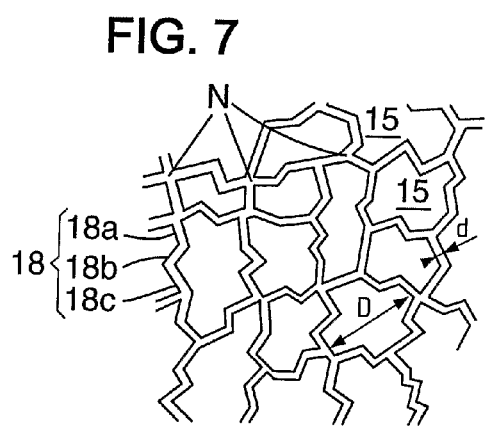
FIG. 7

TRANSPARENT OPTICAL COMPONENT WITH CELLS SEPARATED BY WALLS

CROSS-REFERENCE TO RELATED APPLICATIONS

This application is the National Stage of International Application No. PCT/IB2006/003267, filed on Jul. 13, 2006, which claims the priority of French Application No. 05/07719, filed on Jul. 20, 2005. The contents of both applications are hereby incorporated by reference in their entirety The present invention relates to a transparent optical component which comprises cells separated by walls.

It is known to produce an optical component in the form of a transparent substrate which carries, on at least one of its faces, a set of juxtaposed cells which at least in part covers this face. Substances which have determined optical properties are contained in the cells, and cooperate so as to endow the optical component with the optical characteristics sought for a particular application. For example, transparent substances which have different refractive indices can be distributed in the cells, so that the component obtained constitutes an ametropia correcting lens blank. The lens is then obtained by cutting out the optical component according to a contour which corresponds to a spectacles frame of a wearer of the lens. By virtue of the retention of the substances in the cells, the cutting out of the optical component does not cause any loss of substances, and the optical characteristics of the component are preserved for the lens.

It is also known to place an absorbing substance in the cells of the optical component, so as to obtain an antisolar function or a contrast strengthening function. For an antisolar function, the substance has luminous absorption. In particular, this can be a photochromic substance, whose absorption level varies as a function of received light intensity. For a contrast strengthening function, the substance can have selective transmission which varies as a function of a wavelength of visible light, or as a function of a direction of light polarization.

Such transparent optical components with cells are particularly beneficial, since a large number of different templates can be obtained on the basis of one and the same substrate covered with cells, by varying the substance(s) with optical property(properties) which is (are) placed in the cells. The manufacture of the optical components is then particularly economical, since the substrates covered with cells can be mass-manufactured in a factory. The substrates thereafter receive inside the cells one or more substance(s) with optical property(properties), which are chosen as a function of the optical characteristics sought to meet a customer request. Tailoring of the optical component to each customer is thus carried out, which can be performed downstream in the components distribution chain. The manufacture and distribution logistics are thus simplified and flexible, thereby contributing to an additional reduction in the unit price of each completed optical component delivered. These advantages are particularly significant in ophthalmics, for which spectacles lenses, ocular lenses or ocular implants must correspond to individual prescriptions which depend on each wearer's vision.

Cells neighbouring the surface of the optical component are separated by walls. These separating walls prevent the substances contained in the cells from mixing progressively in the course of the use of the optical component. They thus ensure an almost unlimited lifetime of the optical component, or of an optical element obtained on the basis of the latter.

But, given that each wall has a limited thickness, parallel to the surface of the optical component, it gives rise to microscopic diffraction of the light which reaches the component at the location of this wall. When the walls form a periodic network on the surface of the optical component, the fractions of an incident luminous flux which are diffracted respectively by all the walls are concentrated in certain isolated directions. Macroscopic diffraction results therefrom, which consists in a concentration of the light transmitted or reflected by the component in certain isolated directions. The optical component then appears dark then suddenly luminous, when its orientation with respect to an observer varies, and when the direction of observation coincides with a direction of diffraction. Stated otherwise, a luminous glint is formed in certain directions, from the surface of the optical component. Such an aspect is not aesthetic and, in particular, is not acceptable in ophthalmics.

It is possible to vary the size of the cells along the surface of the optical component to break the periodicity of the network. The light is then diffused macroscopically inside planes perpendicular to the walls, and the optical component appears again irregularly luminous or dark, according to whether the direction of observation does or does not lie in a cells diffusion plane.

In these two cases, the optical component is not regarded as being transparent. An optical component is considered to be transparent when the observation of an image through this component is perceived without significant loss of contrast. Stated otherwise, the interposition of a transparent optical component between an image and an observer of the latter does not significantly reduce the quality of the image. This definition of the term transparent is applicable, within the meaning of the invention, to all the objects regarded as such in the description.

The walls which separate the cells of the optical component interact with the light by diffracting it. Diffraction is defined as the phenomenon of the scattering of light that is observed when a light wave is materially limited (J-P. PEREZ—Optique, Fondements et applications [Optics, Basics and applications]—7$^{th}$ edition—DUNOD—October 2004, p. 262). Thus an optical component comprising such walls transmits a degraded image because of this light scattering induced by said walls. When the cells and hence the walls are not disposed according to a periodic network, the microscopic diffraction appears macroscopically through diffusion. This macroscopic diffusion, or incoherent diffusion, appears as a milky effect (or diffusion halo) of the cellular structure of the optical component. This results in a loss of contrast of the image observed through the component. This loss of contrast is akin to a loss of transparency, such as defined previously. Such a macroscopic diffusion is not acceptable, in particular for an ophthalmic lens which must be transparent and not comprise any luminous effect or defect capable of inconveniencing the vision of a wearer of this lens.

It is also possible to adopt a thickness of walls which is much larger than the wavelength of visible light, so as to reduce the diffraction of the light by each wall. But the cells are then overly large and can be distinguished individually or appear as a granular structure at the surface of the component. The component does not then satisfy the current aesthetics requirements, or those of ophthalmics which are greater.

Finally, it is possible to arrange the cells on the surface of the optical component according to a random or pseudo-random mesh. Random mesh is understood to mean a mesh which is not periodic and which does not exhibit any symmetry. The walls separating the cells are then oriented individually in an arbitrary manner, parallel to the surface of the component, and the light which is transmitted or reflected by the optical component is distributed macroscopically in all directions. Nevertheless, each wall then individually diffracts a perceptible amount of light, so that luminous dots appear at variable locations of the surface of the optical component when it is observed while being progressively rotated. Stated otherwise, a flashing appears on the optical component, which is not acceptable for numerous applications, and in particular for ophthalmic applications.

An aim of the present invention consists in reducing the perception of the luminous glints and the flashing of an optical component with cells separated by walls.

To this end, the invention proposes a transparent optical component which comprises at least one set of cells juxtaposed on a surface of the component. Each cell contains a substance with optical property and two neighbouring cells are separated by a wall which extends perpendicularly to the surface of the component.

In an optical component according to the invention, at least some of the walls are not straight at the surface of the optical component, in other words sections parallel to the component surface of at least some of the walls are not straight, or not rectilinear, at the surface of the component. A segment of wall length diffracts the light in a plane perpendicular to the longitudinal direction of this segment. When the direction of the wall varies between the two ends of the latter, light is diffracted in distinct planes which are offset angularly, so that the luminous intensity diffracted by the wall in a given plane, and in a given direction, is decreased. In the frame of the invention, a partial decrease of the luminous glints is obtained by using non-straight walls, even if the network formed by the walls is periodic. Indeed, as described earlier, the luminous intensity of the luminous glints in a given direction is directly proportional to the length of the wall diffracting in this direction. The intensity which is diffracted by the wall in a given direction is reduced by decreasing the wall length in a given direction, and a luminous glint which would be possibly produced in this direction is then less intense. Thus, the subject-matter of the invention encounters a particular interest for ophthalmic applications.

Furthermore, an optical component according to the invention exhibits all the manufacturing and cost price advantages of transparent optical components with cellular structure.

It also exhibits a high degree of transparency, within the meaning of transparency which was defined above.

The cells can be juxtaposed according to a mesh on the surface of the component, and each wall separating two neighbouring cells extends between two ends of this wall which correspond to nodes of the mesh. At least some of the walls then have variable respective directions along these walls between the corresponding ends, parallel to the surface of the component.

Preferably, the direction of certain walls varies, parallel to the surface of the optical component, by at least 5 degrees along this wall. The optical component is then yet more transparent, and is devoid of luminous glint and/or of flashing even when lighting and observation conditions are particularly unfavourable, for example in the presence of directional lighting.

The invention also relates to an optical element obtained by cutting out a transparent optical component such as described previously. The optical component, or the optical element obtained on the basis of the latter, can be, in a non-limiting manner, a lens for optics instrument, a filter, an optical sight lens, an ocular visor, a lighting device optic, etc. In particular, the invention is advantageously applied to ophthalmic optics. The optical component or element can then be an ophthalmic lens, but also a contact lens or an ocular implant.

Other features and advantages of the present invention will appear in the description hereafter of non-limiting exemplary embodiments, with reference to the appended drawings, in which:

FIG. 1 is an end-on view of an optical component according to the invention;

FIG. 2 is an end-on view of an optical element obtained on the basis of the optical component of FIG. 1;

FIG. 3 is a sectional diagrammatic view of the optical component of FIG. 1;

FIGS. 4 to 7 illustrate four distinct embodiments of the invention;

Figure 8:
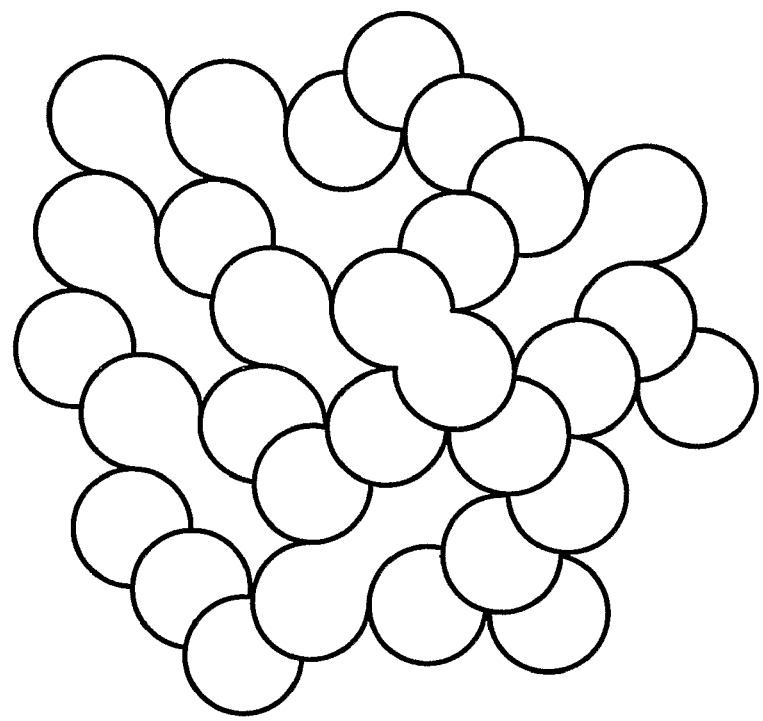
FIG. 8 illustrates a separate embodiment of the invention, comprising a random network based on curved walls.

The optical component 10 represented in FIG. 1 is a blank for spectacles lens. A spectacles lens comprises an ophthalmic lens. Ophthalmic lens is understood to mean a lens which fits a spectacles frame so as to protect the eye and/or correct the sight, this lens being chosen from among afocal, unifocal, bifocal, trifocal and progressive lenses.

FIG. 2 shows a spectacles lens 11, or ophthalmic lens, obtained by cutting the blank 10 along a contour C, represented by dashed lines in FIG. 1. The contour C is a priori arbitrary, provided it is inscribed within the confines of the blank 10. Blanks manufactured in batches are thus usable to obtain lenses that can fit a large variety of spectacles frames. The rim of the cut lens can be trimmed in the usual manner with no problem, so as to endow it with a shape suitable for the frame and for the mode of fastening of the lens to this frame, and/or for aesthetic reasons. It is also possible to drill holes 14 therein, for example to receive screws serving for the fastening of the lens to the frame.

The general shape of the blank 10 can be in accordance with industry standards, with for example a circular peripheral rim B of diameter 60 mm, a convex front face 12 and a concave back face 13 (FIG. 3). The traditional cutting, trimming and drilling tools can thus be used to obtain the lens 11 from the blank 10.

In FIGS. 1 and 2, a partial cutaway of the surface layers reveals the pixellated structure of the blank 10 and of the lens 11. This structure consists of a set of cells 15, also called microtanks, which are formed in a layer 17 of the blank 10 (FIG. 3). In these figures, the dimensions of the layer 17 and of the cells 15 have been exaggerated with respect to those of the blank 10 and of the substrate 16, so as to facilitate the reading of the drawing. The whole set of cells 15 can be disposed on the convex face 12 of the substrate 16, or on its concave face 13. In a preferred manner, the cells 15 have dimensions D less than 500 μm (micrometres), or even less than 100 μm, parallel to the surface of the substrate 16. D corresponds to the average distance between two opposite sides of each cell 15.

The cells 15 are separated by walls 18. The walls 18 have a thickness d advantageously comprised between 0.10 μm and 5 μm, measured parallel to the surface of the optical component, and a height comprised between 1 μm and 50 μm, measured perpendicularly to the surface of the component. They can be made up of opaque or transparent materials. The material of the walls 18 can be selected, in particular, as a function of the optical characteristics of the lens 11. Usable opaque materials comprise metals or metal oxides, such as certain chromium or cobalt oxides, for example, and usable transparent materials are alumina and silica, in particular. Organic materials may also be used for forming the walls 18.

The cells 15, separated by the walls 18, form a mesh on the face 12 or 13 of the substrate 16. Such a mesh is defined by a set of nodes N distributed over the surface of the substrate 16 (FIGS. 4 to 7). Each node N corresponds to the convergence of at least three walls 18, and defines the common position of respective ends of these walls on the substrate 16. Thus, a given node N corresponds to an end line of the walls which converge at this node, this end line being perpendicular to the surface of the substrate 16.

In FIGS. 4-7, the dimension d of the cells 15 and the thickness d of the walls 18 are not in proportion with actual dimension and actual thickness, for the sake of clarity in these figures.

The mesh on the surface of the substrate 16 can be a periodic, or regular, network of nodes disposed on this surface. Such a periodic network can be hexagonal, also termed honeycombed, triangular, for example standing on a base of equilateral triangles, square or rectangular. For a hexagonal network, each node N corresponds to the convergence of three walls 18. For a square or rectangular network, each node N corresponds to the convergence of four walls 18, and for a triangular network, each node N corresponds to the convergence of six walls 18.

Alternatively, the mesh on the surface of the substrate 16 can be of the random mesh type. Such random mesh does not exhibit periodicity or symmetry. Furthermore, distinct nodes of the mesh can correspond to variable numbers of walls which converge. Such random meshes can be generated in numerous ways, in particular by computer. Among them may be cited the abinitio methods, in which the mesh is generated by using processes of random picking of points of the surface of the substrate 16 that are intended to constitute nodes N, and in which walls 18 are created between pairs of these points, likewise picked at random. A random mesh can also be generated by deformation, or destructuration, of a regular mesh. For this purpose, nodes of a regular network are shifted from their initial position in a random or pseudo-random manner, and walls of the thus deformed network may possibly be removed, and/or additional walls may be added.

Preferably, the cells 15 are hermetically sealed, so as to be able to contain a substance with optical property in liquid or gel form. Such liquid or gelled substances are particularly advantageous, since they can be placed in the cells using methods that are simple and fast to implement, such as filling by means of an ink jet head of the kind employed in printers. Furthermore, liquid or gelled substances which have distinct optical properties can easily be mixed to obtain a resulting substance which has an optical property intermediate between those of the initial substances. Such a mixing of substances can be carried out before the filling of the cells, or in situ on the optical component by successively depositing several substances in one and the same cell.

According to a first variant of the invention, at least some of the walls 18 are curved, over the surface of the component 10. In this case, the direction of each wall 18 parallel to the surface of the component 10 varies progressively between the two ends of this wall. FIGS. 4 and 5 illustrate this first variant of the invention, respectively for a square mesh and a random mesh. The curvature of each wall 18 may be arbitrary: it may be constant between the two ends of the wall, or variable. It may also not change sense along the wall, or conversely reverse at least one location on the length of the wall. The variation in curvature of each wall along the latter may itself be random or regular, for example when the wall has the shape of a wave. An illustration of random curvature variation of each wall is especially given by FIG. 8.

Figure 9:
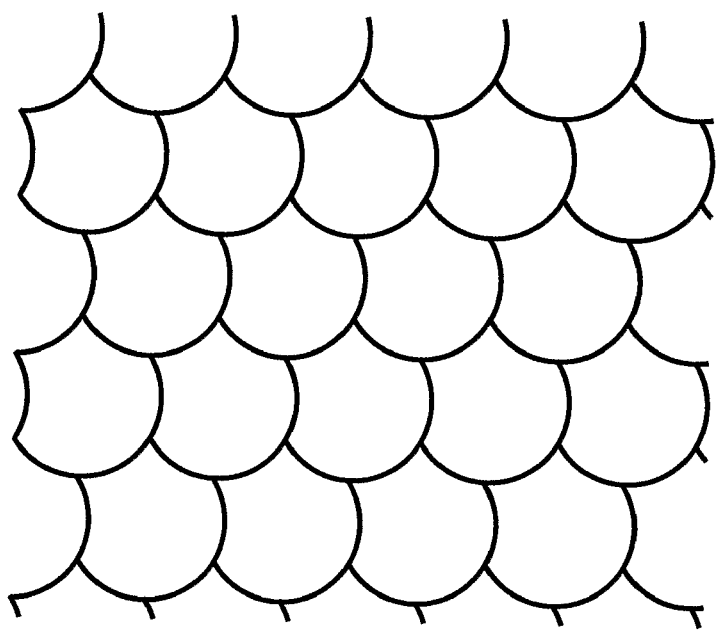
FIG. 9 illustrates a separate embodiment of the invention called imbrication network.

According to an embodiment of this variant, all the walls 18 are curved at the surface of the optical component. In a particularly advantageous manner, each wall 18 forming a cell 15 represents an arc of circle over 60°, over the surface of the optical component A particular embodiment is represented by FIG. 9, which illustrates a portion of an optical component, in which the mesh of the surface of the optical component 10 comprises, over said surface, a periodic network of so-called "imbrication" comprising nodes located on a regular hexagon, each node being connected by an arc of circle over 60°. A variant of the so-called "imbrication" periodic network can also be obtained based on nodes located on a regular square, each node being connected by an arc of circle over 90°.

This network type may be present over all or part of the surface of the optical component. In case the periodic network of so-called "imbrication" is only present over a part of the surface of the optical component, the remaining part of the surface of said optical component can be composed of a mesh of random or pseudo-random type.

According to a second variant of the invention, at least some of the walls 18 comprise a series of straight wall segments, referenced for example 18a, 18b, 18c (FIGS. 6 and 7). The straight wall segments are disposed end-to-end and connect the respective ends of the walls. The direction of each wall 18 parallel to the surface of the optical component is then constant along each segment, and varies between successive segments. FIGS. 6 and 7 illustrate this second variant, respectively for a square mesh and for a random mesh. The successive straight segments of one and the same wall 18 can form any changes of direction whatsoever. Stated otherwise, the angle between two successive segments can have an arbitrary absolute value and an arbitrary sense. The breaking of a wall into straight segments can be performed in a random or pseudo-random manner by controlling the variation in direction between two successive segments. In particular, a wall can be in the shape of a zig-zag, whose profile can constitute a pattern repeated for several walls.

Generally, by virtue of the variation of the direction of each wall 18, an indicator map of luminous diffusion caused by this wall, considered in isolation, is wide enough for the proximity of a large number of such walls at the surface of the component 10 to create a substantially isotropic macroscopic diffusion. No luminous glint nor any flashing then appears when the lens 11 is illuminated. Preferably, to raise the isotropy of the macroscopic diffusion created by the optical component 10, each wall 18 can comprise points located over its length and between which the direction of the wall varies by at least 5 degrees, and preferably by at least 10 degrees.

It is understood that numerous modifications can be introduced into the embodiments of the invention which have been described in detail above, while at least partially preserving some of the advantages of the invention. Among these modifications may be cited:
- several sets of cells may be overlaid in successive layers on one of the faces of the optical component 10;
- two sets of cells can be disposed respectively on the two faces 12 and 13 of the component 10;
- the cells 15 can be disposed according to several different meshes in distinct respective parts of the surface of the optical component 10; and
- antireflective layers and/or hard layers, referenced 19 and 20 in FIG. 3, may be formed above the whole set of cells 15.

The invention claimed is:
1. Transparent optical component comprising at least one set of cells juxtaposed on a surface of the component, each cell containing a substance with optical property and two neighbouring cells being separated by a wall extending perpendicularly to the surface of the component, wherein the cells are juxtaposed according to a mesh on the surface of the component, each wall separating two neighbouring cells extending between two ends of said wall corresponding to nodes of the mesh, and characterized in that a line defined by the path of the wall along the surface and extending between a pair of adjacent nodes is not straight.

2. Optical component according to claim 1, in which at least some of the walls have variable respective directions along said walls between the corresponding ends, parallel to the surface of the component.

3. Optical component according to claim 2, in which the direction of certain walls varies, parallel to the surface of the optical component, by at least 5 degrees along said wall.

4. Optical component according to claim 1, in which at least some of the walls are curved, over the surface of the optical component.

5. Optical component according to claim 1, in which all walls are curved, over the surface of the optical component.

6. Optical component according to claim 5, in which each wall forming a cell represents an arc of circle over 60°, over the whole surface of the optical component.

7. Optical component according to claim 1, in which at least some of the walls comprise a series of straight wall segments connecting respective ends of said walls.

8. Optical component according to claim 2, in which the mesh on the surface of the optical component comprises a periodic network of nodes disposed on said surface.

9. Optical component according to claim 8, in which the mesh on the surface of the optical component comprises, over said surface, a periodic network of so-called "imbrication" comprising nodes located on a regular hexagon, each node being connected by an arc of circle over 60°.

10. Optical component according to claim 8, in which the mesh on the surface of the optical component comprises, over said surface, a periodic network of so-called "imbrication" comprising nodes located on a regular square, each node being connected by an arc of circle over 90°.

11. Optical component according to claim 2, in which the mesh on the surface of the optical component is of random or pseudo-random mesh type.

12. Optical component according to claim 1, in which at least some of the walls have a thickness comprised between 0.10 µm and 5 µm, measured parallel to the surface of the optical component.

13. Optical component according to claim 1, in which the cells are hermetically sealed.

14. Optical element obtained by cutting out a transparent optical component according to claim 1.

15. Optical element according to claim 14, comprising an ophthalmic lens.

16. Optical component according to claim 1, wherein each wall has a substantially uniform thickness as measured in a direction parallel to the surface of the component.

* * * * *